United States Patent
Tsai et al.

(10) Patent No.: US 7,874,710 B2
(45) Date of Patent: Jan. 25, 2011

(54) LIGHT-EMITTING DIODE LAMP

(75) Inventors: Wen-Kuei Tsai, Taipei County (TW);
Chia-Chi Liu, Taipei County (TW);
Chun-Chien Wang, Taipei County
(TW); Ching-Hua Wu, Taipei (TW)

(73) Assignee: Top Energy Saving System Corp.,
Taipei County (TW)

( * ) Notice: Subject to any disclaimer, the term of this
patent is extended or adjusted under 35
U.S.C. 154(b) by 224 days.

(21) Appl. No.: 11/876,778

(22) Filed: Oct. 23, 2007

(65) Prior Publication Data

US 2009/0046473 A1    Feb. 19, 2009

(30) Foreign Application Priority Data

Aug. 13, 2007    (CN) .................... 2007 1 0141163

(51) Int. Cl.
*F21V 29/02*    (2006.01)
(52) U.S. Cl. ................. 362/373; 362/344; 362/345; 362/294; 362/800
(58) Field of Classification Search ............... 362/373, 362/363, 294, 640, 641, 646, 643, 650, 345, 362/344; 313/11, 42
See application file for complete search history.

(56) References Cited

U.S. PATENT DOCUMENTS

| | | | | |
|---|---|---|---|---|
| 6,511,209 | B1 * | 1/2003 | Chiang | 362/294 |
| 6,746,885 | B2 * | 6/2004 | Cao | 438/26 |
| 6,864,513 | B2 * | 3/2005 | Lin et al. | 257/99 |
| 7,165,866 | B2 * | 1/2007 | Li | 362/294 |
| 7,497,596 | B2 * | 3/2009 | Ge | 362/294 |
| 7,524,089 | B2 * | 4/2009 | Park | 362/294 |
| 2005/0111234 | A1 * | 5/2005 | Martin et al. | 362/555 |
| 2006/0120080 | A1 * | 6/2006 | Sipinski et al. | 362/253 |

(Continued)

FOREIGN PATENT DOCUMENTS

CN    2881340    3/2007

(Continued)

OTHER PUBLICATIONS

"1st Office Action of counterpart China application", issued on Jun. 19, 2009, p. 1-p. 5.

(Continued)

*Primary Examiner*—Sandra L O Shea
*Assistant Examiner*—Leah S Lovell
(74) *Attorney, Agent, or Firm*—Stout, Uxa, Buyan & Mullins, LLP

(57) ABSTRACT

An LED lamp including a lamp housing, an LED light source, a heat sink and a control circuit. The lamp housing has an accommodating space, a plurality of air inlets and a plurality of air outlets, wherein the accommodating space joins an environment through the air inlets and the air outlets. The LED light source and the heat sink are disposed in the accommodating space and the heat sink is connected with the LED light source. The heat sink includes a pedestal and a plurality of heat dissipation fins connected to the pedestal. An air convection channel is located between any two adjacent heat dissipation fins. Air from the environment flows into the accommodating space, passes through the air convection channel, and leaves the accommodating space via the air outlets sequentially. The control circuit is disposed in the accommodating space and connected to the LED light source.

21 Claims, 5 Drawing Sheets

U.S. PATENT DOCUMENTS

2007/0195527 A1* 8/2007 Russell ...................... 362/240

FOREIGN PATENT DOCUMENTS

| CN | 2903668 | 5/2007 |
|---|---|---|
| CN | 2906327 | 5/2007 |
| TW | M297444 | 9/2006 |
| TW | M300864 | 11/2006 |

OTHER PUBLICATIONS

"Office Action of counterpart Taiwan application", issued on Oct. 12, 2009, p. 1-p. 5.

* cited by examiner

LIGHT-EMITTING DIODE LAMP

CROSS-REFERENCE TO RELATED APPLICATION

This application claims the priority benefit of Chinese application serial no. 2007101411631, filed on Aug. 13, 2007. All disclosure of the Chinese application is incorporated herein by reference.

BACKGROUND OF THE INVENTION

1. Field of the Invention

The present invention relates to a light-emitting diode lamp (LED lamp), more particularly, relates to an LED lamp with good heat dissipation performance.

2. Description of the Related Art

LEDs are semiconductor devices. The light emitting chips are mainly made of a compound semiconductor material containing III-V group chemical elements, for example, GaP, GaAs, and the like, and function on the principle of converting electric energy to light. That is to say, the compound semiconductor is powered to release excessive energy through the combination of electrons and holes, so as to emit photon (light). The LED can emit light without being heated or does not discharge to emit light. Therefore, the lifespan of the LED is up to 100,000 hours, and an idling time is not required. In addition, the LED has advantages of quick response speed (approximately $10^{-9}$ seconds), small volume, power-saving, low pollution, high reliability, and ease mass production. Thus, the LEDs have been intensively used in many fields, for example, light source and illumination device in large-scale bulletin boards, traffic lights, cellular phones, scanners, fax machines, etc.

Currently, the light emitting brightness and efficiency of the LEDs are continuously improved, and meanwhile the white LEDs with high brightness are successfully put into mass production, so the white LEDs have been gradually used in illumination devices such as indoor illumination and outdoor street lamp. Generally, heat dissipation performance is important to high power LEDs. If LEDs operates under high temperature, the brightness that the LED light can provide may be reduced and the life span thereof is reduced. Therefore, how to enhance heat dissipation performance of LEDs is an important topic for research and development people.

SUMMARY OF THE INVENTION

The present invention provided an LED with good heat dissipation performance and long life span.

The present invention provides an LED including a lamp housing, an LED light source, a heat sink and a control circuit. The lamp housing has an accommodating space, a plurality of air inlets and a plurality of air outlets, and the accommodating space joins an environment through the air inlets and air outlets. The LED light source and the heat sink are disposed in the accommodating space, and the heat sink is connected to the LED light source, wherein the heat sink includes a pedestal and a plurality of heat dissipation fins connected to the pedestal. There is an air convection channel between any two adjacent heat dissipation fins. An air convection channel is located between any two adjacent heat dissipation fins, wherein air from the environment is suitable for flowing into the accommodating space via the air inlets, passing through the air convection channels, and leaving the accommodating space via the air outlets. The control circuit is disposed in the lamp housing and is electrically connected to the LED light source.

In an embodiment of the present invention, the lamp housing includes a first cap, a lampshade, a second cap and a conductive plug for accommodating the heat sink. The lampshade is connected to the first cap, and the LED light source is disposed in the lampshade. The second cap is connected to the first cap, so that the first cap is disposed between the lampshade and the second cap. The plug is connected to the second cap, so that the second cap is disposed between the conductive plug and the first cap.

In an embodiment of the present invention, the material of the first cap includes insulation material, such as insulation material with doped zinc oxide.

In an embodiment of the present invention, the material of the second cap includes insulation material, such as insulation material with doped zinc oxide.

In an embodiment of the present invention, the first cap has air inlets, and the second cap has air outlets, wherein each of the air inlets may be an opening with or without barricade, while each of the air outlets may be an opening with or without barricade.

In an embodiment of the present invention, each of the air inlets is a slot-shaped air inlet, and the slot-shaped air inlets are arranged in grating. In addition, each of the slot-shaped air inlets is corresponding to one of the air convection channels of the heat sink, respectively.

In an embodiment of the present invention, the first cap has air outlets, and the second cap has air inlets, wherein each of the air inlets may be an opening with or without barricade, while each of the air outlets may be an opening with or without barricade.

In an embodiment of the present invention, each of the air outlets is a slot-shaped air inlet, and the slot-shaped air outlets are arranged in grating. In addition, each of the slot-shaped air outlets is corresponding to one of the air convection channels of the heat sink, respectively.

In an embodiment of the present invention, the LED light source is an LED package or other types of LED light sources.

In an embodiment of the present invention, the materials of the pedestal and heat dissipation fins are same or different from each other.

In an embodiment of the present invention, the control circuit is a circuit board.

In an embodiment of the present invention, the above circuit board has at least a through hole allowing air to flow within the accommodating space.

In an embodiment of the present invention, the LED lamp may further includes a fan disposed in the accommodating space, wherein the air from the environment is driven by the fan to flow into the accommodating space via the air inlets, pass through the air convection channels, and leave the accommodating space via the air outlets in sequence.

In an embodiment of the present invention, the fan is disposed on the pedestal, and the fan is surrounded by the heat dissipation fins.

In an embodiment of the present invention, the fan and the LED light source are disposed on two opposite sides of the pedestal, respectively.

Since heat generated from the LED lamp of the present invention is capable of removing by the built-in heat sink and the air convection such that the operation temperature of the LED lamp can be maintained within an acceptable range. In other words, the LED lamp of the present invention is not damaged due to over-heating.

In order to the make the aforementioned and other objects, features and advantages of the present invention comprehensible, a preferred embodiment accompanied with figures is described in detail below.

BRIEF DESCRIPTIONS OF DRAWINGS

Figure 5A:
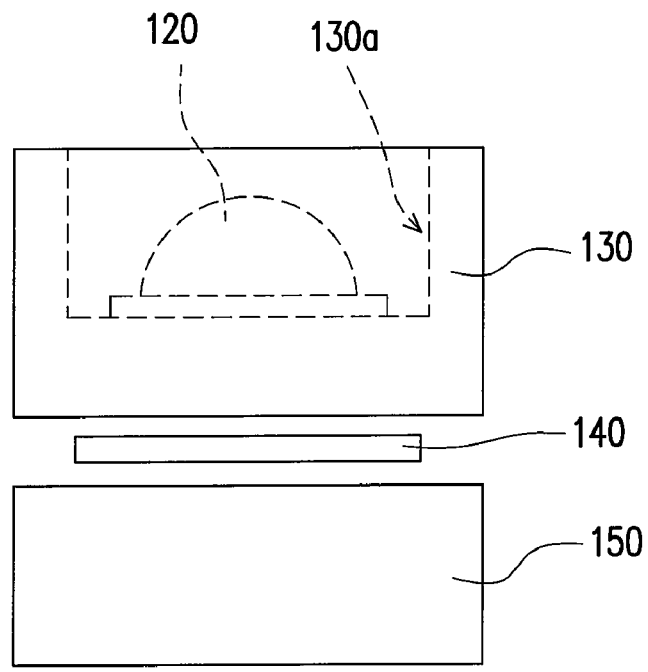
Figure 5B:
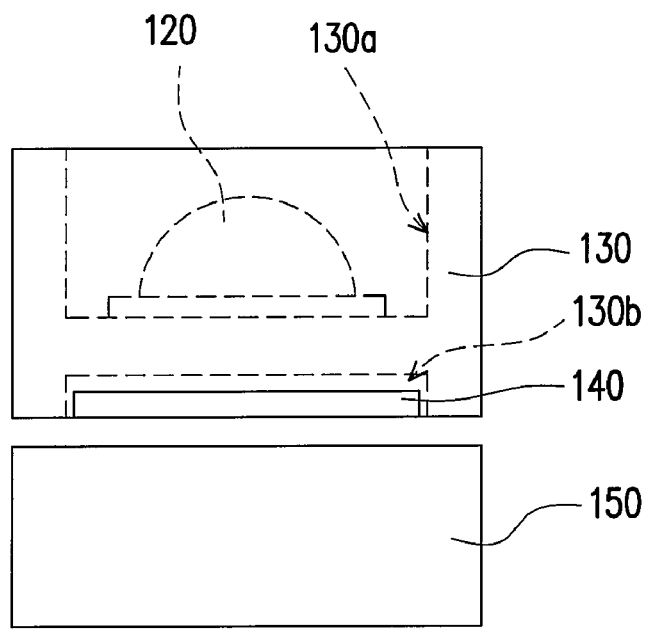

FIG. 5A~FIG. 5B are diagrams of relative locations of the fan, the control circuit, the heat sink and the LED light source of the third embodiment of the present invention.

DESCRIPTION OF EMBODIMENTS

The First Embodiment

Figure 1:
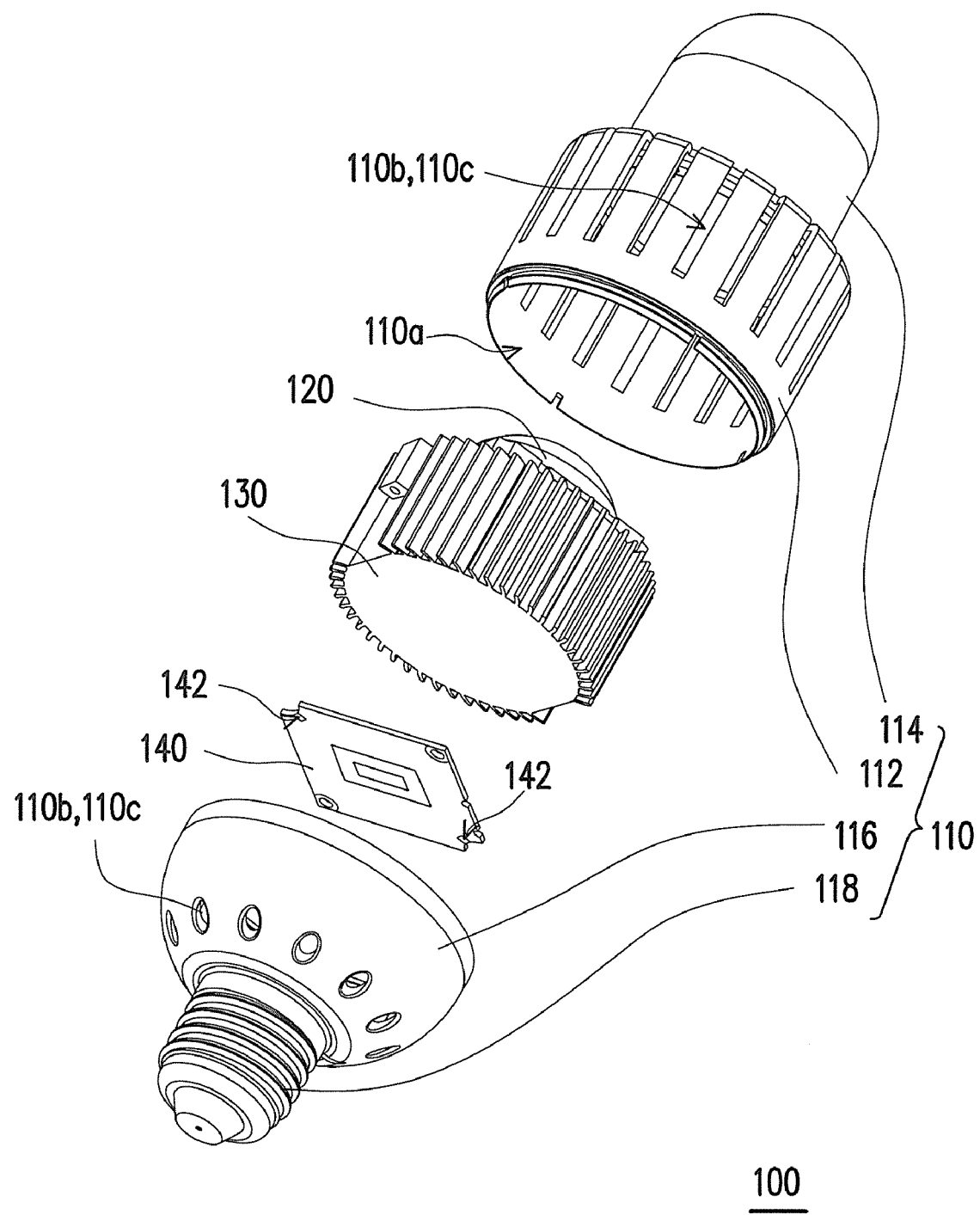
FIG. 1 is a diagram of an LED lamp of the first embodiment of the present invention.

FIG. 1 is a diagram of an LED lamp of the first embodiment of the present invention. With reference to FIG. 1, the LED lamp 100 of the present embodiment includes a lamp housing 110, an LED light source 120, a heat sink 130 and a control circuit 140. The lamp housing 110 has an accommodating space 110a, a plurality of air inlets 110b and a plurality of air outlets 110c, and the accommodating space 110a joins the environment through the air inlets 110b and air outlets 110c. The LED light source 120 and the heat sink 130 are both disposed in the accommodating space 110a, and the heat sink 130 is connected to the LED light source 120, wherein the heat sink 130 has a pedestal 132 and a plurality of heat dissipation fins 134 connected to the pedestal 132. As shown in FIG. 1, an air convection channel 136 is formed between any two adjacent heat dissipation fins 134, and air from the environment is suitable for flowing into the accommodating space 110a via the air inlets 110b, passing through the air convection channel 136, and leaving the accommodating space 110a via the air outlets 110c sequentially. In addition, the control circuit 140 is disposed in the accommodating space 110a of the lamp housing 110 and is electrically connected to the LED light source 120.

The structure of the lamp housing 110, the LED light source 120, the heat sink 130 and the control circuit 140 may have many varieties, and the structural design schematically shown in FIG. 1 is only illustrated as an example for one skilled in the art to implement the present invention, rather than limiting the scope of the present invention.

As shown in FIG. 1, the LED lamp 100 of the present embodiment is an LED light bulb, and the LED lamp may be a light bulb with E27 plug, a light bulb with E26 plug, a light bulb with E14 plug, or light bulbs of other specifications. Specifically, the lamp housing 110 of the present embodiment includes a first cap 112, a lampshade 114, a second cap 116 and a conductive plug 118. The lampshade 114 is connected to the first cap 112, and the LED light source 120 is disposed in the lampshade 114. The second cap 116 is connected to the first cap 112, so that the first cap 112 is disposed between the lampshade 114 and the second cap 116. In addition, the conductive plug 118 is connected to the second cap 116, so that the second cap 116 is disposed between the conductive plug 118 and the first cap 112. The conductive plug 118 of the present embodiment is an E27 plug, an E26 plug, an E14 plug, or plugs of other specifications, for example.

Generally, the first cap 112 and the second cap 116 are usually fabricated with insulation material (such as plastic) to ensure safety of users. However, the present invention does not limit that the first cap 112 and the second cap 116 have to be fabricated with the same insulation material. The first cap 112 and the second cap 116 may also be fabricated with conductive material according to different design requirements.

In an embodiment of the present invention, the material of the first cap 112 and the second cap 116 may be insulation material with doped zinc oxide. Since the insulation material with doped zinc oxide has function of Electro-Magnetic Interference shielding (EMI shielding), the first cap 112 and the second cap 116 with doped zinc oxide are capable of shielding the electromagnetic wave generated from the LED lamp 100, such that harm resulted from the electromagnetic wave can be reduced. In addition, the first cap 112 and the second cap 116 may be fabricated by injection molding, and deformation of the first cap 112 and the second cap 116 made by the insulation material with doped zinc oxide can be effectively controlled after the first cap 112 and the second cap 116 are released from mold. Therefore, the yield rate of the first cap 112 and the second cap 116 can be increased.

As shown in FIG. 1, the LED light source 120 is an LED package fabricated by packaging process, and the package may be a SMD type package or other type of package. In the present embodiment, the LED light source 120 may be bonded with the heat sink 130 with solder material, so that the heat generated by the LED light source 120 can be effectively conducted to the heat sink 130. Additionally, the present embodiment may also use thermal paste together with screw to perform the bonding between the LED light source 120 and the heat sink 130.

In the present embodiment, the heat sink 130 may be fabricated with single material or a plurality of materials. In other words, the pedestal 132 and the heat dissipation fins 134 of the heat sink 130 may be fabricate with the same or different materials. Generally, the material of the heat sink 130 may be copper, aluminum, alloy, or other material with high thermal conductivity.

In the present embodiment, the control circuit 140 is a circuit board independent from the LED light source 120. The circuit board may be a circuit board with single circuit layer or a circuit board with a plurality of circuit layers. In order to facilitate the air convection in the accommodating space 110a, at least one through hole 142 may be fabricated on the circuit board. In an alternative embodiment of the present invention, the control circuit 140 may be a chip. When the control circuit 140 is a chip, the control circuit 140 may be integrated into the LED light source 120 to reduce the overall volume occupied by the LED lamp. Moreover, when the control circuit 140 is a chip, the control circuit 140 may also be integrated into the circuit board in the LED light source 120.

Figure 2A:
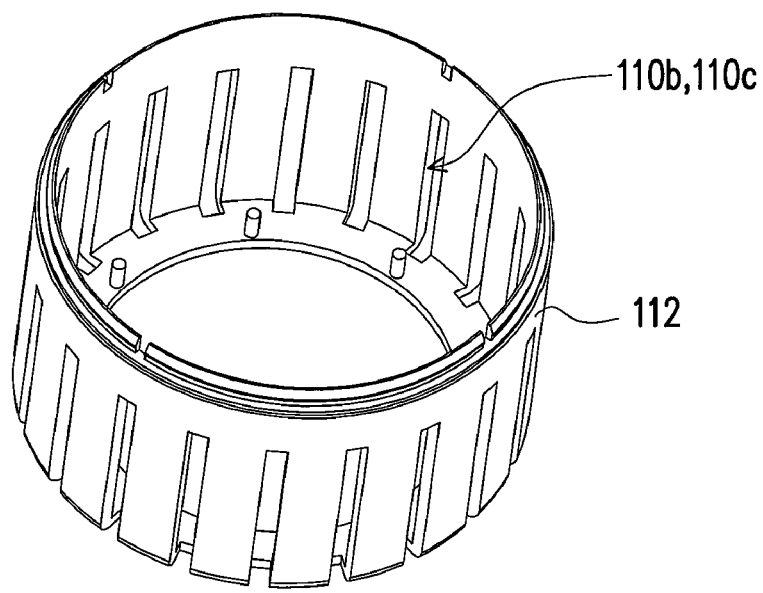
FIG. 2A is a diagram of the first cap body having air inlets without barricade or air outlets without barricade.
Figure 2B:
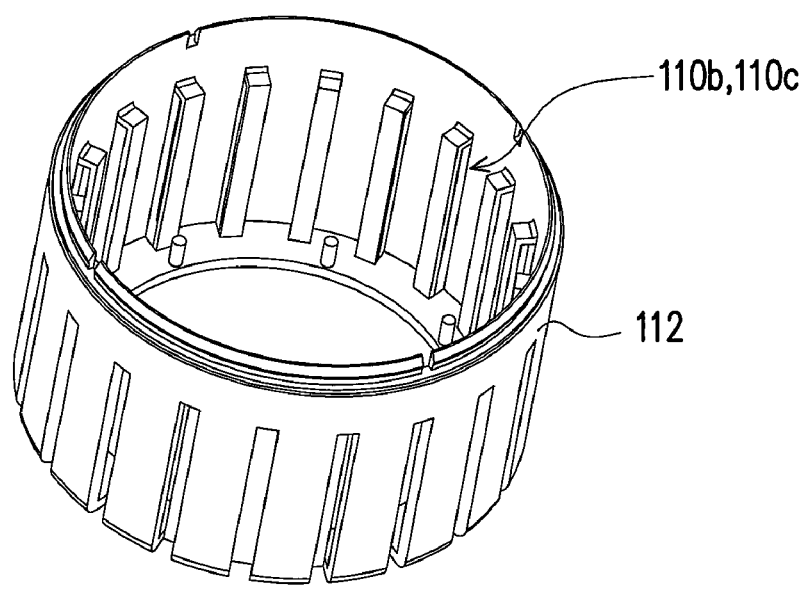
FIG. 2B is a diagram of the first cap body having air inlets with barricade or air outlets with barricade.
Figure 3A:
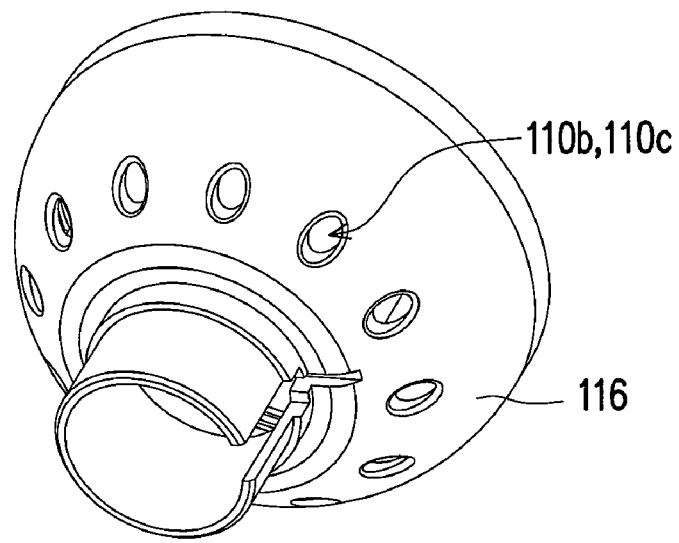
FIG. 3A is a diagram of the second cap body having air inlets without barricade or air outlets without barricade.
Figure 3B:
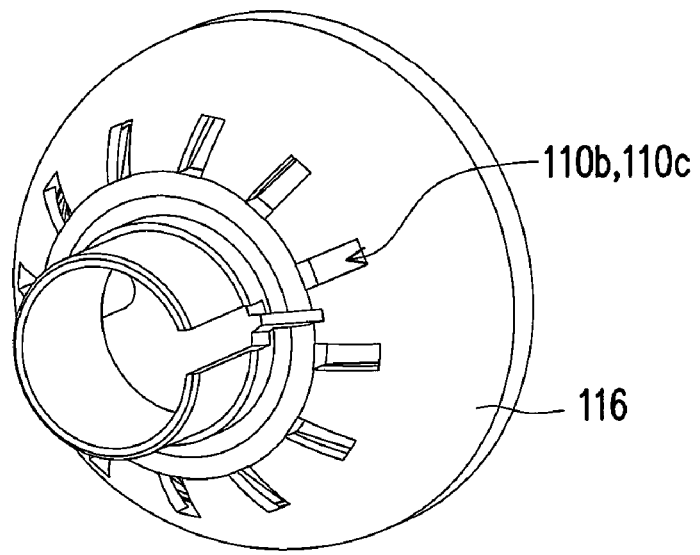
FIG. 3B is a diagram of the second cap body having air inlets with barricade or air outlets with barricade.

The air inlets 110b and the air outlets 110c formed on the lamp housing 110 are defined according to the convection direction of the air in the accommodating space 110a. When the air in the accommodating space 110a flows towards the second cap 120 from the first cap 110, the openings on the first cap 112 are defined as the air inlets 110b (as shown in FIG. 2A and FIG. 2B), and the openings on the second cap 120 are defined as the air outlets 110c (as shown in FIG. 3A and FIG. 3B). On the contrary, when the air in the accommodating space 110a flows towards the first cap 110 from the second cap 120, the openings on the first cap 112 are defined as the air outlets 110c (as shown in FIG. 2A and FIG. 2B), and the openings on the second cap 120 are defined as the air inlets 110b (as shown in FIG. 3A and FIG. 3B).

With reference to FIG. 1, FIG. 2A and FIG. 2B, the openings on the first cap 112 (the air inlets 110b or the air outlets 110c) may be slot-shaped openings (slot-shaped air inlets or slot-shaped air outlets). In the present embodiment, the slot-shaped openings may be arranged in grating. Additionally, each of the slot-shaped openings is corresponding to one of the air convection channels 136 of the heat sink. Such design facilitates heat dissipation performance of the LED lamp 100.

FIG. 2A is a diagram of the first cap body having air inlets without barricade or air outlets without barricade, and FIG. 2B is a diagram of the first cap body having air inlets with barricade or air outlets with barricade. With reference to FIG. 2A and FIG. 2B, if user can directly observe the situations in the first cap 112 through the air inlets 110b or the air outlets 110c, the air inlets 110b or the air outlets 110c are so-called open type air inlets 110b or open type air outlets 110c (as shown in FIG. 2A); if user can't directly observe the inside of the first cap 112 through the air inlets 110b or the air outlets 110c, the air inlets 110b or the air outlets 110c are so-called semi-open type air inlets 110b or semi-open type air outlets 110c (as shown in FIG. 2B).

FIG. 3A is a diagram of the second cap body having air inlets without barricade or air outlets without barricade, and FIG. 3B is a diagram of the second cap body having air inlets with barricade or air outlets with barricade With reference to FIG. 3A and FIG. 3B, similarly, if user can directly observe the inside of the second cap 116 through the air inlets 110b or the air outlets 110c, the air inlets 110b or air outlets 110c are so-called open type air inlets 110b or open type air outlets 110c (as shown in FIG. 3A); if user can't directly observe the inside of the second cap 116 through the air inlets 110b or the air outlets 110c, the air inlets 110b or air outlets 110c are so-called semi-open type air inlets 110b or semi-open type air outlets 110c (as shown in FIG. 3B).

The Second Embodiment

Figure 4:
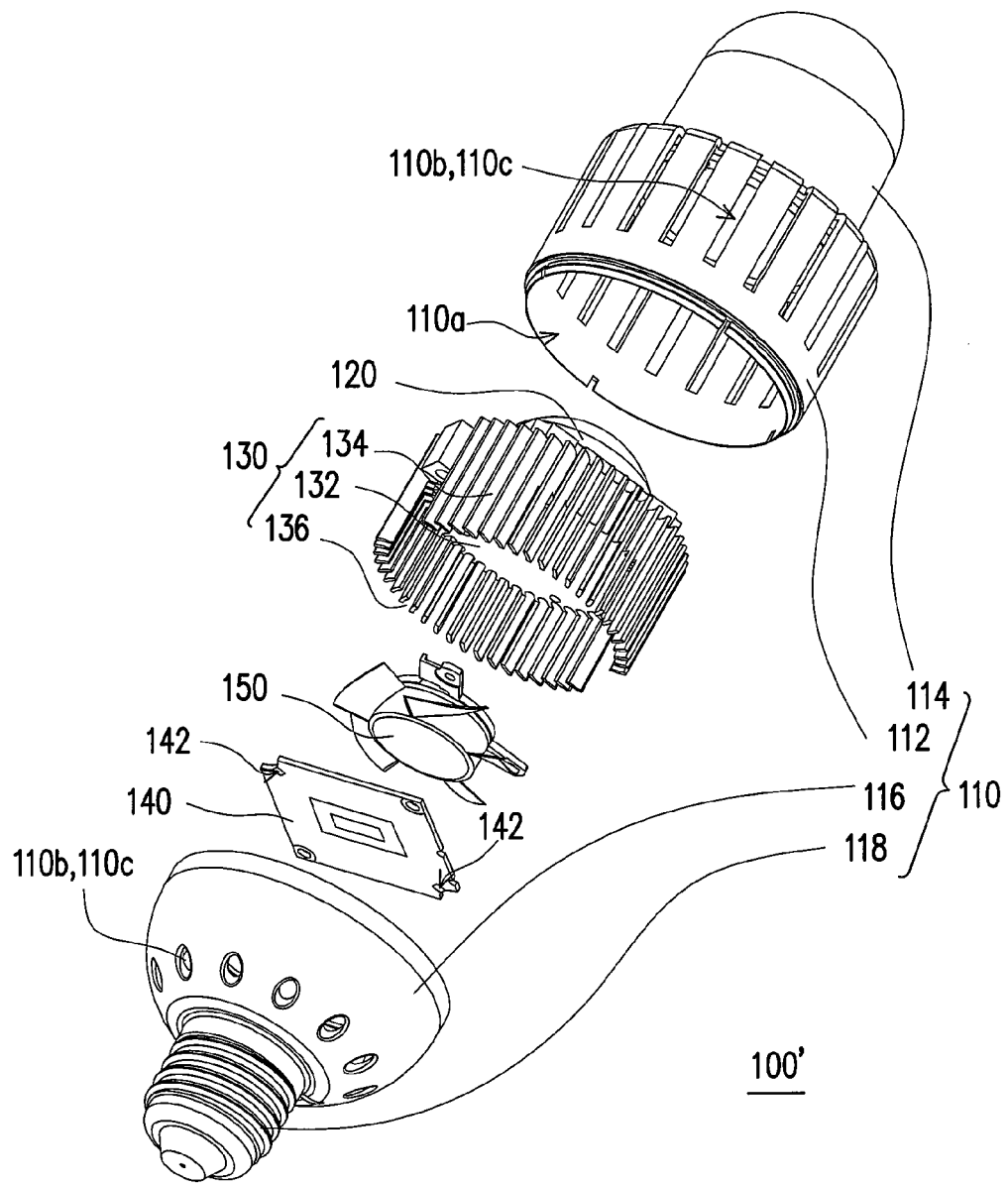
FIG. 4 is a diagram of an LED lamp of the second embodiment of the present invention.

FIG. 4 is a diagram of an LED lamp of the second embodiment of the present invention. With reference to FIG. 2, the LED lamp 100' of the present embodiment is similar to the LED lamp 100 illustrated in the first embodiment except that the LED lamp 100' of the present embodiment further includes a fan 150 disposed in the accommodating space 110a, wherein the air from the environment is driven by the fan 150 to flow into the accommodating space 110a via the air inlets 110b, pass through the air convection channels 136, and leave the accommodating space 110a via the air outlets 110c in sequence. As shown in FIG. 4, the fan 150 is disposed on the pedestal 132, and the fan 150 is surrounded by the heat dissipation fins 134. When the fan 150 is turned on, the air convection in the accommodating space 110a is boosted, so that the LED lamp 100' can operate under a lower temperature. It is noted that, in the present embodiment, the fan 150 and the LED light source 120 are disposed on two opposite sides of the pedestal 132, respectively.

The Third Embodiment

FIG. 5A~FIG. 5B are diagrams of relative locations of the fan, the control circuit, the heat sink and the LED light source of the third embodiment of the present invention. With reference to FIG. 5A and FIG. 5B, the present embodiment is similar to the second embodiment. In the present embodiment, the heat sink 130 has a first trench 130a on one side to accommodate the LED light source 120. The control circuit 140 (e.g. circuit board) is disposed on another side of the heat sink 130. In addition, As shown in FIG. 5A and FIG. 5B, the control circuit 140 is disposed between the fan 150 and the heat sink 130. In the present embodiment, the LED light source 120 may be bonded on the heat sink 130 with solder material, so that the heat generated by the LED light source 120 can be effectively conducted to the heat sink 130. Additionally, the present embodiment may also use thermal paste together with screw to perform the bonding between the LED light source 120 and the heat sink 130.

It is noted that the heat sink 130 used in the present embodiment may have an second trench 130b (as shown in FIG. 5B) to accommodate the control circuit 140. As shown in FIG. 5B, the second trench 130b can not only reduce the overall volume, but also allows the fan 150 to be closer to the heat sink 130, so as to have a better heat dissipation performance.

As described above, the arrangement of the components of the LED lamp in the present invention may change in accordance with different design requirements. The above embodiment of the present invention is not used to limit the arrangement of components.

To sum up, the present invention uses the heat sink built in the LED lamp to dissipate heat generated therefrom, such that the operation temperature of LED lamp can be effectively maintained within an acceptable range. Therefore, the life span of LED lamp is prolonged.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A light-emitting diode (LED) lamp, comprising:
 a lamp housing having a first cap defining an accommodating space with a first cap sidewall, a plurality of through slots passing through said first cap sidewall, wherein the accommodating space joins an environment through the first cap through slots;
 an LED light source disposed in the accommodating space;
 a heat sink disposed in the accommodating space and connected to the LED light source, the heat sink comprising a pedestal and a plurality of heat dissipation fins connected to the pedestal, an air convection channel being located between each respective two adjacent heat dissipation fins, wherein the heat dissipation fins are surrounded by the through slots;
 a fan disposed in the accommodating space; and
 a control circuit disposed in the lamp housing and electrically connected to the LED light source;
 wherein the lamp housing further comprises:
  a second cap having a plurality of openings passing through a second cap sidewall;
 wherein said heat dissipating fins are displaced each from the other and positioned between said through slots of said first cap, each of said through slots being in radial alignment with a respective air convection channel;
 wherein the fan and the LED light source are disposed on two opposite sides of the pedestal of the heat sink respectively, and the fan is surrounded by the heat dissipation fins of the heat sink;
 wherein the air from the environment is driven by the fan to flow into the accommodating space via the first cap through slots, pass through the air convection channels, the control circuit, and leave the accommodating space via the openings of the second cap sidewall.

2. The LED lamp of claim 1, wherein the lamp housing comprises:
 a lampshade connected to the first cap, wherein the LED light source is disposed in the lampshade; and
 a conductive plug connected to the second cap, wherein the second cap is disposed between the conductive plug and the first cap.

3. The LED lamp of claim 2, wherein a material of the first cap comprises insulation material.

4. The LED lamp of claim 3, wherein a material of the first cap comprises zinc oxide doped insulation material.

5. The LED lamp of claim 2, wherein a material of the second cap comprises insulation material.

6. The LED lamp of claim 5, wherein a material of the second cap comprises doped zinc oxide insulation material.

7. The LED lamp of claim 2, wherein the first cap has air inlets, and the second cap has air outlets.

8. The LED lamp of claim 7 wherein each of the air inlets is an opening with or without barricade.

9. The LED lamp of claim 7, wherein each of the air outlets is an opening with or without barricade.

10. The LED lamp of claim 2, wherein the first cap has air outlets, and the second cap has air inlets.

11. The LED lamp of claim 10, wherein each of the air inlets is an opening with or without barricade.

12. The LED lamp of claim 10, wherein each of the air outlets is an opening with or without barricade.

13. The LED lamp of claim 10, wherein each of the air outlets is a slot-shaped air outlet, and the slot-shaped air inlets are arranged in grating.

14. The LED lamp of claim 13, wherein each of the slot-shaped air outlets respectively corresponds to one of the air convection channels of the heat sink.

15. The LED lamp of claim 1, wherein the LED light source comprises an LED package.

16. The LED lamp of claim 1, wherein a material of the pedestal is the same as a material of the heat dissipation fins.

17. The LED lamp of claim 1, wherein a material of the pedestal and a material of the heat dissipation fins are different.

18. The LED lamp of claim 1, wherein the control circuit comprises a circuit board.

19. The LED lamp of claim 18, wherein the circuit board comprises at least a through hole.

20. The LED lamp of claim 1, wherein the heat sink further comprises a first trench, the LED light source is disposed inside the first trench, and the control circuit is located between the fan and the heat sink.

21. The LED lamp of claim 20, wherein the heat sink further comprises a second trench, the first trench and the second trench are disposed on two opposite sides of the pedestal, respectively, and the control circuit is disposed inside the second trench.

* * * * *